United States Patent [19]
Aida et al.

[11] Patent Number: 5,221,782
[45] Date of Patent: Jun. 22, 1993

[54] COMPOSITION FOR INJECTION MOLDING

[75] Inventors: Fuyuki Aida, Tokyo; Tsutomu Miyamoto, Ibaragi; Masaaki Miyazaki, Yokohama, all of Japan

[73] Assignee: Nippon Petrochemicals Company, Limited, Tokyo, Japan

[21] Appl. No.: 724,438

[22] Filed: Jul. 2, 1991

Related U.S. Application Data

[63] Continuation of Ser. No. 545,336, Jun. 26, 1990, abandoned.

[30] Foreign Application Priority Data

Jun. 28, 1989 [JP]  Japan ................................. 1-163645
Jun. 28, 1989 [JP]  Japan ................................. 1-163646

[51] Int. Cl.⁵ ............................................. C08K 3/34
[52] U.S. Cl. ............................... 524/451; 524/490; 524/570; 524/575.5; 524/584; 524/586; 525/331.7; 525/333.7; 525/375; 525/383; 525/385
[58] Field of Search ............ 524/451, 490, 570, 575.5, 524/584, 586; 525/331.7, 333.7, 375, 383, 385

[56] References Cited

U.S. PATENT DOCUMENTS

Re. 31,518  2/1984  Fischer .
Re. 32,028  11/1985  Fischer .
3,806,558   4/1974   Fischer .
4,212,787   7/1980   Matsuda et al. .
4,247,652   1/1981   Matsuda et al. .
4,918,127   4/1990   Adur et al. ........................... 524/437

FOREIGN PATENT DOCUMENTS 324278   7/1989   European Pat. Off. .............. 524/87
1010549  11/1965  United Kingdom .

Primary Examiner—Melvyn I. Marquis
Assistant Examiner—Mark Sweet
Attorney, Agent, or Firm—Dilworth & Barrese

[57] ABSTRACT

A composition for injection molding well-balanced in rigidity, impact resistance, appearance of molded products and moldability is obtained by using as an essential component a partially crosslinked product being prepared by dynamically heat-treating:

(A) 40–100% by weight of an α-olefin (co)polymer resin having 2 to 8 carbon atoms;
(B) 0–60% by weight of rubbery substance; 0.01–0.07 parts by weight, based on 100 parts by weight of said components (A)+(B), of at least one crosslinking agent selected from:
(C) a dihydroaromatic compound or a polymer thereof,
(D) an ether family compound,
(E) a tetrahydroaromatic compound, and
(F) a cyclopentane family compound; and
(G) 0.01–7 parts by weight of a polyfunctional monomer based on 100 parts by weight of said components (A)+(B).

12 Claims, No Drawings

COMPOSITION FOR INJECTION MOLDING

This is a continuation of copending application Ser. No. 07/545,336 filed on Jun. 26, 1990, now abandoned.

BACKGROUND OF THE INVENTION

The present invention relates to a composition for injection molding and a composition for vehicular exterior material. More particularly, the present invention is concerned with a composition for injection molding and a composition for vehicular exterior material both containing a partially crosslinked product prepared by dynamically heat-treating an α-olefin (co)polymer having 2 to 8 carbon atoms and a rubbery substance as well as, if necessary, an inorganic filler and/or a softening agent in the presence of a specific crosslinking agent and a polyfunctional monomer. The compositions of the present invention are well-balanced in rigidity, impact resistance, appearance of molded products and moldability, and are employable for baskets and bamboo baskets for documents sorting, kitchen use, dressing room use, fruits and refuse, for lids of various things of daily necessities, namely, for caps of wide-mouth bottles, toy parts, and also for vehicular exterior materials such as rear finisher, sill, rear coater panel, engine hood, trunk lid, fender, door panel, protector, bumper fascia, energy absorber, air spoiler, side molding, weather strip, shock absorber, dust boots, vacuum connector, rack and pinion boots, and mud guard.

Thermoplastic elastomer (TPE) is mentioned as one of those commonly used heretofore as thermoplastic resins for injection molding. Above all, olefinic thermoplastic elastomers are used frequently because they are inexpensive.

Generally, such olefinic thermoplastic elastomers are blends each comprising as a hard segment a crystalline polypropylene (hereinafter referred to simply as "PP") or polyethylene and as a soft segment an ethylene-α-olefin copolymer rubber, e.g. ethylene-propylene rubber (hereinafter referred to simply as "EPR") or ethylene-propylene-diene random copolymer rubber, or an olefinic elastomer such as polyisobutylene or polybutadiene. Partially crosslinking is often conducted for the improvement of physical properties.

For example, in Japanese Patent Laid-Open No. 41950/1979 there is disclosed a composition prepared by kneading PP and EPR with polyethylene having a density of 0.915 to 0.97 and peroxide. Further, in Japanese Patent Laid-Open No. 139445/1980 there is proposed a composition comprising PP, EPR, a high-density polyethylene and talc, and in Japanese Patent Laid-Open Nos. 42643/1983 and 80335/1983 there is proposed a composition comprising PP, EPR and a linear ethylene-α-olefin copolymer.

The conventional processes for the preparation of such injection molding compositions are broadly classified into the following two.

The first process is a mere blending of a thermoplastic resin with a rubbery substance. This process involves problems such as deterioration of mechanical characteristics and of heat resistance, ineffective improvement of impact resistance, and poor appearance of molded products such as the presence of weld mark and flow mark.

According to the second process, an organic peroxide is added at the time of kneading of a thermoplastic resin and a rubbery substance to enhance the effect of improving mechanical characteristics as compared with that obtained in the aforementioned simple blending. Thus, an organic peroxide is used in this process, so when a peroxide degradation type resin such as polypropylene is used as the hard segment, there rapidly occurs thermal decomposition of the organic peroxide, with the result that a molecular cutting reaction is unavoidable, thus leading to deterioration in mechanical characteristics such as flexural modulus and yield tensile strength.

In the case of using a peroxide crosslinking type resin such as polyethylene, a crosslinking reaction of the hard segment proceeds and fluidity is deteriorated markedly, resulting in that the moldability is deteriorated to the extent of molding being difficult, and in order to ensure good moldability it is necessary to use an extremely small amount of an organic peroxide. Thus, the handling is difficult.

Anyhow, even in a crosslinking reaction using a peroxide, deterioration of mechanical characteristics is unavoidable as in the foregoing simple blend; besides, the surface appearance of a molded product obtained is inferior, such as the presence of weld mark or flow mark.

Recently, the use of TPO for injection molding has been expanded to the automobile industry, i.e., automobile parts, and at the same time performance conditions required have been more and more diversified.

For example, as to automobile exterior materials, not only high heat resistance and low-temperature impact resistance but also good moldability, product appearance and coatability are required. It is difficult for conventional thermoplastic elastomers (TPE) to satisfy all of these requirements. Particularly, with conventional TPE's, the balance between low-temperature impact resistance and the surface appearance of molded products, such as whether weld mark or flow mark is present or not, is still unsatisfactory.

Particularly, where the inorganic filler is a metal oxide (or hydroxide), the receptivity of polyolefin resins is low and the dispersibility is poor, so molded products obtained are inferior not only in the appearance thereof but also in the mechanical characteristics thereof. To avoid this, it is necessary to add a soft substance or a high-molecular compound having a polar group.

Thus, the thermoplastic resin compositions for injection molding prepared by the above conventional processes are not fully satisfactory in practical use, so the provision of an improved and superior composition is desired.

The present invention has been accomplished in view of the above-mentioned points and it is an object thereof to provide a composition for injection molding well balanced in mechanical characteristics, appearance of a molded product obtained using the composition and moldability, and having improved compatibility with thermoplastic resin compositions and inorganic fillers, by using a partially crosslinked product prepared by dynamically heat-treating an α-olefin (co)polymer and a rubbery substance in the presence of a special crosslinking agent and a polyfunctional monomer, and, if necessary, also using an inorganic filler and/or a softening agent, all in specific proportions.

It is another object of the present invention to provide a composition for vehicular exterior material of high performance superior in low-temperature impact resistance and having a beautiful surface appearance, which composition is constituted by a thermoplastic resin composition containing a partially crosslinked product obtained by dynamically heat-treating a specific amount of a polypropylene resin, or a polyethylene resin if desired, and a rubbery substance in the presence of a special crosslinking agent and a polyfunctional monomer, or such thermoplastic resin further containing a softening agent and/or an inorganic filler.

SUMMARY OF THE INVENTION

Having made extensive studies along the above-mentioned objects, the present inventors found out that a molded product not deteriorated in mechanical characteristics as compared with the results obtained by the conventional crosslinking using organic peroxides, and remarkably superior in the surface appearance free of weld mark or flow mark, is obtained by using a thermoplastic resin composition containing a partially crosslinked product prepared by dynamically heat-treating a thermoplastic resin and a rubbery substance in the presence of a specific compound such as a dihydroaromatic compound or a polymer thereof as a crosslinking agent and a polyfunctional monomer, or such thermoplastic resin composition further incorporating therein a softening agent and/or an inorganic filler. In this way we accomplished the present invention.

More specifically, in one aspect of the present invention there is provided a composition for injection molding comprising a partially crosslinked product prepared by dynamically heat-treating:
- (A) 40–100 wt % of an α-olefin (co)polymer resin having 2 to 8 carbon atoms;
- (B) 0–60 wt % of a rubbery substance; 0.01–7 parts by weight, based on 100 parts by weight of the components (A)+(B), of at least one crosslinking agent selected from:
- (C) a dihydroaromatic compound or a polymer thereof,
- (D) an ether family compound,
- (E) a tetrahydroaromatic compound, and
- (F) a cyclopentane family compound; and
- (G) 0.01–7 parts by weight of a polyfunctional monomer based on 100 parts by weight of the components (A)+(B).

In the second aspect of the present invention there is provided a composition for injection molding comprising:
100 parts by weight of the above injection molding composition containing the above partially crosslinked product; and
- (H) 1–50 parts by weight of a softening agent; and/or
- (I) 1–100 parts by weight of an inorganic filler.

In the third aspect of the present invention there is provided a thermoplastic resin composition for vehicular exterior material, comprising a partially crosslinked product prepared by dynamically heat-treating:
- (A) 40–90 wt % of an α-olefin (co)polymer resin having 2 to 8 carbon atoms;
- (B) 10–60 wt % of a rubbery substance; 0.01–7 parts by weight, based on 100 parts by weight of the components (A)+(B), of at least one crosslinking agent selected from:
- (C) a dihydroaromatic compound or a polymer thereof,
- (D) an ether family compound,
- (E) a tetrahydroaromatic compound, and
- (F) a cyclopentane family compound; and
- (G) 0.01–7 parts by weight of a polyfunctional monomer based on 100 parts by weight of the components (A)+(B).

In the fourth aspect of the present invention there is provided a composition for vehicular exterior material, comprising:
100 parts by weight of the composition containing the partially crosslinked product mentioned in the above third aspect; and
- (H) 1–30 parts by weight of a softening agent; and/or
- (I) 1–100 parts by weight of an inorganic filler.

DETAILED DESCRIPTION OF THE INVENTION

The present invention will be described in detail hereinunder.

As examples of the α-olefin (co)polymer (A) having 2 to 8 carbon atoms used in the present invention, there are mentioned homopolymers of α-olefin such as polyethylene, polypropylene, poly-1-butene, poly-4-methylpentene-1 and polyhexene-1, as well as intercopolymers of such α-olefins.

More particularly, there may be used such polyethylene resins as high and medium density polyethylenes, high pressure process low-density polyethylenes, linear low-density polyethylenes, very-low density polyethylenes, ethylene-unsaturated carboxylate copolymers, and ethylene-carboxylic acid unsaturated ester copolymers; such homopolymers as isotactic polypropylene and syndiotactic polypropylene; propylene-ethylene block copolymer, and propylene-1-butene copolymer. These polymers may be used each alone or as mixtures.

Particularly, polypropylene resins (PP) are preferred because they are inexpensive and well balanced in various physical properties such as mechanical characteristics, e.g. rigidity, heat resistance, and the appearance of molded products, e.g. luster.

Examples of the rubbery substance (B) used in the present invention included ethylene-α-olefin copolymer rubbers such as ethylene-propylene random copolymer and ethylene-propylene-diene random copolymer, natural rubber, isobutene rubber, butadinene rubber, 1,2-polybutadiene, styrene-butadiene random copolymer rubber, chloroprene rubber, nitrile rubber, styrene-butadiene-styrene block copolymer rubber, and styrene-isoprene-styrene block copolymer rubber. These rubbery substances may be used each alone or as mixtures. Particularly, ethylene-propylene-diene random copolymer rubber and ethylene-propylene random copolymer rubber are preferred.

The two rubbers just mentioned above, as compared with the other rubbery substances, are superior in thermoplasticity and can be easily dispersed by melt-kneading. Further, in comparison with SBR, isoprene rubber, nitrile rubber and butadiene rubber, they do not have any peculiar offensive odor and are easy to weight and handle in mixing because they are available as pellets. Besides, the two rubbers in question have a large degree of freedom in selecting a desired type of a composition preparting apparatus, thus having advantages in operation.

As to the diene component in the above ethylene-propylene-diene random copolymer rubber, it may be any of ethylidene norbornene, dicyclopentadiene, and 1,4-cyclohexadiene.

The Mooney viscosity of the rubbery substances exemplified above is preferably in the range of $ML_{1+4}(100°\ C.) = 10$ to 100, more preferably $ML_{1+4}(100°\ C.) = 20$ to 90. If $ML_{1+4}(100°\ C.)$ is less than 10, the impact resistance will be scarcely improved and if $ML_{1+4}(100°\ C.)$ is larger than 100, the dispersion of the rubbery substance used into the matrix resin will be poor.

The dihydroaromatic compound (C) used as a crosslinking agent in the present invention is a compound containing one or more aromatic rings, of which at least one aromatic ring is dihydrogenated. The aromatic ring as referred to herein indicates a ring structure in which the number of $\pi$-electrons shown in the definition of aromaticity (see, for example, "Yuki Kagaku-No Kiso," Tokyo Kagaku Dojin K.K., translated by Toshio Goto, (1974), pp.105-106) [Richard S. Mon-son & John C. Shelton, "Fundamentals of Organic Chemistry," MacGraw-Hill, Inc. (1974)] is $4n+2$ (n is an integer). For example, pyridine and quinoline are included. Therefore, examples of the dihydroaromatic compound used in the present invention include dihydro derivatives of quinoline. Further, the dihydroaromatic compound used in the present invention may contain a substituent group. Alkyl substituted compounds as well as derivatives substituted with various elements or functional groups are employable. The dihydroaromatic compounds employable in the present invention can be prepared by the application of known chemical reactions. Examples of such dihydroaromatic compounds now available include 1,2-dihydrobenzene, cis-1,2-dihydrocatechol, 1,2-dihydronaphthalene, 9,10-dihydrophenanthrene, as well as 1,2-dihydroquinoline compounds such as 6-decyl-2,2,4-trimethyl-1,2-dihydroquinoline, 6-ethoxy-2,2,4-trimethyl-1,2-dihydroquinoline, and 2,2,4-trimethyl-1,2-dihydroquinoline. Polymers of these compounds are also employable.

Among the dihydroaromatic compounds employable in the present invention there are included those heretofore known as antioxidant agents (see, for example, Japanese Patent Publication No. 46661/1980). However, these compounds have been used not as crosslinking agents but as ageing preventing agents together with conventional crosslinking agents such as sulfur compound, organic peroxides, phenolic compounds, or quinonedioxime compounds.

Thus, the prior art is lacking in the knowledge of the present invention, namely, the knowledge that dihydroaromatic compounds polymers thereof exhibit crosslinking reactivity, or the knowledge that a combined used of such dihydroaromatic compounds and polyfunctional monomers permits a mild crosslinking reaction to proceed.

The ether compound (D) used as a crosslinking agent in the present invention may be straight-chained or cyclic and may contain a substituent group. Examples are cyclic ethers such as 1,3-dioxolan and 1,4-dioxane; straight-chain ethers such as ethyl ether and isopropyl ether; non-aromatic cyclic vinyl ethers typified by 3,4-dihydro-2-pyran and 4H-chromene; furan derivatives typified by furfuryl alcohol, furfuryl aldehyde, benzofuran and furfuryl acetate; straight-chain vinyl ether compounds typified by n-octadecyl vinyl ether and ethyl vinyl ether; and enol ethers and esters of carbonyl compounds such as ketone, esters, lactones, aldehydes, amides and lactams typified by ketene acetal, isopropenyl acetate, vinyl acetate and 1-amino-1-methoxyethylene. These compounds may contain substituent groups. Alkyl substituted compounds and derivatives substituted with various elements and functional groups are also employable. Further, these compounds may be used each alone or as mixtures. Particularly, vinyl and alkenyl ethers are preferred.

The tetrahydroaromatic compound (E) used as a crosslinking agent in the present invention is a compound in which at least one aromatic ring is tetrahydrogenated. The "aromatic ring" as referred to herein is of the same definition as that of aromaticity mentioned previously. For example, furan, benzene and naphthalene are included. Thus, examples of the tetrahydroaromatic compound used in the present invention include tetrahydro derivatives of naphthalene. Further, the tetrahydroaromatic compound used in the invention may contain a substituent group. Alkyl substituted compound as well as derivatives substituted with various elements or functional groups are also employable. The tetrahydroaromatic compounds employable in the present invention can be prepared by the application of known chemical reactions. Examples of those now available include 1,2,3,4-tetrahydronaphthalene, tetrahydrobenzene and tetrahydrofuran. Polymers of these compounds are also employable.

The cyclopentane compound (F) used as a crosslinking agent in the present invention indicates a compound which includes at least one cyclopentane, cyclopentene or cyclopentadiene skeleton. More specifically, it is a five-membered compound the ring of which is constituted by only carbon atoms. Examples include cyclopentane, cyclopentene, cyclopentadiene, dicyclopentadiene, indene, indane, and fluorene. These compounds may contain substituent groups. Alkyl substituted compounds as well as substituted derivatives using various elements and functional groups are also employable. These compounds may be used each alone or as mixtures.

In the present invention it is necessary to use the component(s) (C), (D), (E), (F), in combination with the polyfunctional monomer (G).

Examples of the polyfunctional monomer (G) include higher esters of methacrylic acid typified by trimethylolpropane trimethacrylate and ethylene glycol dimethacrylate; polyfunctional vinyl monomers typified by divinylbenzene, triallyl isocyanurate and diallyl phthalate; and bismaleimides typified by N,N'-m-phenylene bismaleimide and N,N'-ethylene bismaleimide. Particularly, bismaleimide compounds and di(meth)acrylate compounds are preferred because these compounds are highly reactive and the addition of polar groups leads to the improvement in dispersibility and receptivity of inorganic fillers such as metal oxides for example. These compounds may be used in combination of two or more.

Examples of the softening agent (H) used in the present invention are synthetic oils such as paraffinic and naphthenic oils, high-boiling petroleum components, and liquid polyisobutene.

As the inorganic filler (I) used in the present invention there may be used a known powdered, flat plate-like, scale-like, needle-like, spherical, hollow, or fibrous inorganic filler. Examples are powdered fillers such as calcium carbonate, magnesium carbonate, calcium sulfate, siliceous sand calcium, clay, diatomaceous earth, talc, alumina, glass powder, iron oxide, metal powder, graphite, silicon carbide, silicon nitride, silica, boron nitride, aluminum nitride, and carbon black; metallic foils such as mica, glass plate, sericite, pyrophyllite, and aluminum flake; flat plate-like or scale-like fillers such as graphite; hollow fillers such as Shirasu balloon, metal balloon, and pumice; and mineral fibers such as glass fibers, carbon fibers, graphite fibers, whisker, metal fibers, silicon carbide fibers, asbestos, and wollastonite.

These fillers may be used each alone or as mixtures. The kind and the amount of the fillers(s) to be used may be determined according to the purpose of use. For the improvement of dispersibility it is desirable for these fillers to be surface-treated with a silane coupling agent, and organic titanate-based coupling agent, or a metallic salt of a fatty acid.

The partially crosslinked product used in the present invention is obtained by mixing the thermoplastic resin (A), the rubbery substance (B), the crosslinking agent (C), (D), (E), (F) and the polyfunctional monomer (G) beforehand or at the time of heat treatment, and dynamically heat-treating the resulting mixture.

In the partially crosslinked composition thus obtained by the dynamic heat treatment, the boiling xylene insolubles content in the composition prepared by melt-kneading the said mixture is increased as compared with that before the kneading.

As one criterion for the effect of the present invention there is mentioned such increase of the boiling xylene insolubles content attained by the heat treatment.

Generally, the larger the boiling xylene insolubles content, the more remarkable the improvement in the effect of addition of the rubbery substance, including the improvement of impact strength and tensile strength.

A main factor of such increase in the boiling xylene insolubles content resides in the amount of the crosslinking agent and that of the polyfunctional monomer used, which amount differs depending on the kind of the crosslinking agent and that of the polyfunctional monomer used or the melt-kneading apparatus and conditions used.

The temperature of the foregoing dynamic heat treatment is not lower than the melting point or softening point of the $C_2$–$C_8\alpha$-olefin (co)polymer and/or the rubbery substance and below the decomposition point thereof. Preferably, the dynamic heat treatment is conducted at a temperature of 120° to 350° C. for 20 seconds to 20 minutes.

The melt kneading is preferably performed using a mixing machine which affords a high shear rate to facilitate the formation of radical in the mixture.

As the melt-kneading apparatus for the dynamic heat treatment there may be used any of known apparatus, including open type mixing rolls, non-open type Bumbury's mixer, extruder, kneader, and twin-screw extruder.

In preparing the partially crosslinked product used in the present invention it is necessary to use 40–100 wt % of the $\alpha$-olefin (co)polymer (A) having 2 to 8 carbon atoms, 0–60 wt % of the rubbery substance (B), 0.01–7 parts by weight, based on 100 parts by weight of the resin and rubbery substance, of at least one compound as a crosslinking agent selected from the dihydroaromatic compound or a polymer thereof (C), ether family compound (D), tetrahydroaromatic compound (E) and cyclopentane family compound (F), and 0.01–7 parts by weight of the polyfunctional monomer (G) based on 100 parts by weight of the resin and the rubbery substance.

In the partially crosslinked product, if the amount of component (A) is smaller than 40 wt %, the resistance will be poor although the impact resistance will be improved.

If the amount of the crosslinking agent and that of the polyfunctional monomer are smaller than 0.01 part by weight, the crosslinking effect will be poor, and if they exceed 7 parts by weight, there will occur bleeding to the surface and coloration, thus causing increase of cost, in the case of the polyfunctional monomer, and coloration and increase of cost will result in the case of the crosslinking agent.

In the case of using the softening agent (H), the amount thereof is in the range of 1 to 50, preferably 1 to 30, part by weight based on 100 parts by weight of the resin and the rubbery substance. If the amount of the softening agent is smaller than 1 part by weight, the effect of improvement in fluidity will be poor, and if it exceeds 50 parts by weight, poor rigidity will result.

The softening agent may be added during and/or after the heat treatment in the total amount or in a suitably divided manner, but preferably it is melt-kneaded together with the other components at the time of the heat treatment.

Also, the inorganic filler (I) may be added during and/or after the heat treatment in the total amount or in a suitably divided manner, but preferably it is melt-kneaded together with the other components in the heat treatment. This is desirable for enhancing the compatibility between the composition and the inorganic filler.

The amount of the inorganic filler is in the range of 1 to 100, preferably 2 to 50, parts by weight based on 100 parts by weight of the resin and the rubbery substance. If the amount of the organic filler is smaller than 1 part by weight, the effect of its addition will not be satisfactory, and if it exceeds 100 parts by weight, deterioration will result in point of tensile elongation and the appearance of molded products obtained.

It is important that the partially crosslinked product be contained in the composition of the present invention.

It is desirable that the content of the partially crosslinked product be at least 10 wt %, preferably not less than 20 wt %, more preferably not less than 30 wt %, based on the weight of the organic components.

As the resin incorporated in the partially crosslinked product there may be used the component (A) and/or the component (B). No special limitation is placed on the resin if only it is within the scope not departing from the gist of the present invention.

The composition for vehicular exterior material in the third aspect of the present invention will be described in detail below.

The "vehicular exterior material" as referred to herein is of automobile and the like, including, for example, fender, door panel, protector, rear finisher, rear coater panel, engine hood, trunk lid, bumper fascia, energy absorber, air spoiler, side molding, weather strip, shock absorber, dust boots, vacuum connector, and rack and pinion boots.

Recently, particularly in the automobile industry, the field in which plastics are used has been expanded, including automobile parts, and at the same time requirements have been diversified. For example, as to vehicular exterior materials, not only high heat resistance and low-temperature impact resistance are required but also excellence is required for moldability and the appearance of molded products (for example, good surface appearance is required, such as the absence of weld mark or flow mark) and also for coatability.

As a composition for such vehicular exterior materials satisfying the above requirements it is suitable to use the thermoplastic composition according to the present invention containing a partially crosslinked product which comprises, as the $C_2$-$C_8$ α-olefin (co)polymer, 40-90 wt % of a polypropylene resin ($A_1$) and 0-30 wt % of a polyethylene resin ($A_2$) (provided the total of $A_1+A_2$ is in the range of 40 to 90 wt %), 10-60 wt % of the rubbery substance (B), at least one crosslinking agent selected from (C), (D), (E) and (F), and the polyfunctional monomer (G), or a thermoplastic resin composition comprising the said composition and the softening agent (H) and/or the inorganic filler (I). These compositions are superior particularly as bumper materials.

Suitable examples of the polypropylene resin (PP) include homopolypropylene, propylene-ethylene block copolymers, and propylene-butene-1 copolymer.

It is preferable that the propylene content in the above copolymers be not less than 60 wt %.

The melt flow rate (hereinafter referred to simply as "MFR") MFR of the above polypropylene is in the range of 5 of 50, preferably 6 to 45, more preferably 7 to 40. In the case of using a PP having a high MFR, due to a too great difference in viscosity in the melt kneading with the rubbery substance, it will be impossible to obtain a good dispersed state, so the resulting product will be inferior in impact resistance, having flow mark. If there is used a PP having a low MFR, there will be obtained only such a composition as having fluidity unsatisfactory for injection molding, and a bad weld mark will appear.

As preferred examples of the polyethylene resin ($A_2$) there are mentioned high-pressure process low-density polyethylenes, linear low-density polyethylenes and very-low density polyethylenes.

In the foregoing thermoplastic resin composition suitable for bumper, the proportion of the component ($A_1$) is in the range of 40 to 90 wt %, preferably 45 to 75 wt %, more preferably 50 to 70 wt %; the proportion of the component ($A_2$) is in the range of 0 to 30 wt %; and that of the component (B) is in the range of 10 to 60 wt %, preferably 25 to 55 wt %, more preferably 30 to 50 wt %.

If the proportion of the polypropylene resin as component ($A_1$) is smaller than 40 wt %, the resulting composition will be poor in heat resistance, and if it exceeds 90 wt %, the impact resistance will be low.

In the composition for injection molding or the composition for vehicular exterior material according to the present invention, the partially crosslinked product containing the above polypropylene resin as a predominant ingredient and the rubbery substance is used as a main component. In this case, there may be added PP etc. used in the component ($A_1$) in an amount less than 50 wt %.

Bumpers of automobiles and the like have been more and more diversified recently. Both hard and soft bumpers are used. As the material for hard bumpers it is desirable to use a composition obtained by incorporating 1-100 parts by weight of an inorganic filler into the above composition containing the partially crosslinked product. On the other hand, as the material for soft bumpers it is desirable to use a composition obtained by incorporating 1-50 parts by weight of the above composition containing the partially crosslinked product.

The vehicular exterior material constituted by the composition of the present invention is superior in heat resistance, impact resistance and coatability without deterioration in moldability and weld characteristic.

If necessary, into the composition of the present invention there may be incorporated stabilizer, antioxidant, ultraviolet ray absorber, lubricant, foaming agent, antistatic agent, flame retardant, dye, pigment, etc.

Thus in the present invention there are used a special crosslinking agent and a polyfunctional monomer in combination, the thermoplastic resin composition for injection molding according to the present invention is superior in mechanical characteristics, e.g. rigidity, and in heat resistance, affording good appearance of product superior in gloss and free of such defects as flow mark and weld mark.

In the vehicular exterior material obtained according to the present invention, not only the above physical properties are retained but also, unlike the conventional crosslinking method using a peroxide, there does not occur any excessive molecular cuting (degradation) or crosslinking for polypropylene and rubber, and good dispersibility of the two ensures high heat resistance, impact resistance and coatability.

The present invention will be described below concretely in terms of working examples, but it is to be understood that the invention is not limited thereto.

Examples 1-20 and Comparative Examples 1-7

40-90 wt % of polypropylene resin ($A_1$), 0-30 wt % of very-low density polyethylene ($A_2$), 10-60 wt % of rubbery substance (B), 1-30 parts by weight of softening agent (H) and/or 1-17 parts by weight of inorganic filler (I), crosslinking agents (C), (D), (E), (F) and polyfunctional monomer (G) were heat-treated dynamically. Test pieces were produced by injection-molding each composition and then annealing the resulting molded product, unless otherwise described.

How to prepare compositions, conditions for producing test pieces by injection molding, and testing methods are as follows.

How to Prepare Compositions

Compositions were each prepared by:
1) mixing thermoplastic resin (A), rubbery substance (B), crosslinking agent (C), (D), (E), (F) and polyfunctional monomer (G) in predetermined proportions by means of a Henschel mixer, provided in the case of further adding inorganic filler (I), mixing it together with the components (A) to (G), and 2) melt-kneading the resulting mixture at a resin temperature of 180° to 260° C. and at a revolution of 200 rpm, using a continuous twin-screw extruder (30 mm dia., a product of Plastic Kogaku Kenkyu-Sho K.K.).

Where the addition of a softening agent was required, it was poured using a reciprocating fixed displacement pump connected to a vent hole.

Conditions for Injection Molding

Molding machine: IS-90B (a product of Toshiba Machine Co., Ltd.)
Injection pressure: 1,000 kg/cm$^2$
Molding temperature: 180°-260° C.
Mold temperature: 50° C.

Testing and Measuring Methods (Melt Flow Rate)

According to JIS K6758 and K6760

(Yield Tensile Strength, Ultimate Tensile Strength and Ultimate Elongation Length)

According to JIS K6760, K6758 and K7113.

(Heat Deformation Temperature)

According to JIS K7270, under a load of 4.6 kg.

(Flexural Modulus)

According to JIS K6758 and K7203.

(Izod Impact Value)

According to JIS K6758 and K7110.

(Boiling Xylene Insolubles Content)

A 20 mm×50 mm×0.2 mm film formed by pressing was placed in a 120-mesh wire gauze and then immersed in boiling xylene for 5 hours. The weight of the film before the immersion and that after the immersion were measure, and a boiling xylene insolubles content was obtained from the following equation:

Boiling xylene insolubles content (wt %) =

$$\frac{\text{Weight (g) of film after immersion in boiling xylene}}{\text{Weight (g) of film before immersion in boiling xylene}} \times 100$$

(Spiral Flow)

A sample is injected into a mold having a cavity of a predetermined spiral using the following molding conditions. The length of the spiral thus formed is measured for evaluating the melt-fluidity of the sample.

Conditions of Injection Molding

Molding machine: IS-90B (a product of Toshiba Machine Co., Ltd.)
Injection pressure: 1,000 kg/cm$^2$
Molding temperature: 230° C.
Stroke: 25 mm
Injection time: 15 sec
Curing time: 10 sec
Interval time: 3 sec
Mold: Archimedes type, temp. 50° C.

(Weld)

A sample is injected into a plane mold having a size of 80 mm×240 mm×3 mm and having a hole of 20 mm×20 mm located at a position of 70 mm from the gate, using the following molding conditions and the molded article is evaluated by eyes:

Conditions for Injection Molding

Molding machine: IS-90B (a product of Toshiba Machine Co., Ltd.)
Injection pressure: 1,000 kg/cm$^2$
Molding temperature: 180°–260° C.
Mold temperature: 50° C.

In the evaluation, A–E is used in the order of merit (i.e. "A" indicates "best").

(Flow Mark)

A sample is injected into a plane mold having a size of 100 mm×200 mm×3 mm using the following molding conditions and the molded article is evaluated by eyes.

Conditions for Injection Molding

Molding machine: IS-90B (a product of Toshiba Machine Co., Ltd.)
Injection pressure: 1,000 kg/cm$^2$
Molding temperature: 230° C.
Mold temperature: 50° C.

In the evaluation, A–E is used in the order of merit (i.e. "A" indicates "best").

(Face Impact Test (ductile fracture critical temp.))

According to Nisseki 3034-87

The components (A), (B), (C), (D) and (E) used in the working examples of the present invention and the Comparative examples are as follows:

Component (A): Polypropylene ($A_1$-1) Polypropylene (1)

(trade name: Nisseki Polypro J650G, MRF=8.0 g/min, d=0.90~0.91 g/cm$^3$, a product of Nippon Petrochemicals Co., Ltd.)

($A_1$-2) Polypropylene (2)

(trade name: Nisseki Polypro J880G, MRF=40 g/min, d=0.90~0.91 g/cm$^3$, a product of Nippon Petrochemicals Co., Ltd.)

($A_1$-3) Polypropylene (3)

(trade name: Nisseki Polypro J160G, MRF=14 g/min, d=0.90~0.91 g/cm$^3$, a product of Nippon Petrochemicals Co., Ltd.)

($A_1$-4) Polypropylene (4)

(trade name: Nisseki Polypro J871M, MRF=23 g/min, d=0.90~0.91 g/cm$^3$, a product of Nippon Petrochemicals Co., Ltd.)

Component ($A_2$): Very-Low Density Polyethylene ($A_2$-1) Very-low density polyethylene (1)

(trade name: Nisseki Softrex D9010, MRF=1.0 g/min, d=0.900 g/cm$^3$, a product of Nippon Petrochemicals Co., Ltd.)

($A_2$-2) Very-low density polyethylene (2)

(trade name: Nisseki Softrex D9005, MRF=0.5 g/min, d=0.900 g/cm$^3$, a product of Nippon Petrochemicals Co., Ltd.)

Component (B): Rubbery Substance ($B_1$) Ethylene-propylene-diene random copolymer rubber (1)

(trade name: EP57P, ML$_{1+4}$(100° C.)=88, a product of Japan Synthetic Rubber Co., Ltd.)

($B_2$) Ethylene-propylene-diene random copolymer rubber (2)

(trade name: EP 22, ML$_{1+4}$(100° C.)=42, a product of Japan Synthetic Rubber Co., Ltd.)

($B_3$) Ethylene-propylene random copolymer rubber (1)

(trade name: EP02P, ML$_{1+4}$(100° C.)=24, a product of Japan Synthetic Rubber Co., Ltd.)

($B_4$) Ethylene-propylene random copolymer rubber (2)

(trade name: EP07P, ML$_{1+4}$(100° C.)=70, a product of Japan Synthetic Rubber Co., Ltd.)

Crosslinking Agent

Component (C): Dihydroaromatic Compound ($C_1$) Poly (2,2,4-trimethyl-1,2-dihydroquinoline)

(trade name: Nocrac 224S, a product of Ohuchi Shinko Kagaku K.K.)

(C2) 9,10-Dihydrophenanthrene (a product of Tokyo Kasei K.k.)

Component (D): Ether Family Compound (D1) 3,4-Dihydro-2-pyran (a product of Tokyo Kasei K.K.)

(D2) Isopropenyl acetate (a product of Tokyo Kasei K.K.)

Component (E): Tetrahydroaromatic Compound (E1) 1,2,3,4-Tetrahydronaphthalene (a product of Tokyo Kasei K.K.)

(E2) Tetrahydrobenzene (a product of Tokyo Kasei K.K.)

(E3) Tetrahydrofuran (a product of Tokyo Kasei K.K.)

Component (F): Cyclopentane Family Compound (F1) Indene

Component (G): Polyfunctional Monomer (G-1) N,N'-m-Phenylene bismaleimide (trade name: Vulnoc PM, a product Ohuchi Shinko Kagaku K.K.)

(G-2) Ethylene glycol dimethacrylate (a product of Tokyo Kasei K.K.)

Component (H): Softening Agent

Paraffinic process oil (a product of Nippon Oil Co., Ltd.)

Component (I): Inorganic Filler

Talc (trade name: TALC FFR, a product of Asada Seifun K.K.)

Crosslinking Agent: Organic Peroxide (J1) α,α'-Bis(t-butylperoxy)-m-diisopropylbenzene (trade name: Perbutyl P, a product of Nippon Oils & Fats Co., Ltd.)

TABLE 1

Examples 1-8. Comparative Examples 1-3

| Example | Component A Kind | Component A Amount (wt %) | Component B Kind | Component B Amount (wt %) | Filler Amount (wt part) | Crosslinking Agent kind | Crosslinking Agent Amount (wt part) | Polyfunctional monomer Kind | Polyfunctional monomer Amount (wt part) | Melt Flow Rate (g/10 min) (at 230° C.) | Spiral Flow (mm) | Yield Tensile Strength (kgf/cm$^2$) | Ultimate Tensile at Break (kgf/cm$^2$) |
|---|---|---|---|---|---|---|---|---|---|---|---|---|---|
| Example 1 | A-1 A2 | 62 8 | B1 | 30 | 17 | C1 | 1.50 | G1 | 1.80 | 8.0 | 690 | 170 | 110 |
| Example 2 | A1-2 | 72 | B2 | 28 | 11 | C2 | 0.12 | G1 | 0.1 | 7.0 | 660 | 200 | >175 |
| Example 3 | A1-2 | 79 | B3 | 21 | 5 | D1 | 0.12 | G2 | 0.1 | 7.0 | 680 | 215 | >187 |
| Example 4 | A1-3 | 74 | B4 | 26 | 11 | D2 | 0.12 | G1 | 0.1 | 3.2 | 590 | 186 | >168 |
| Example 5 | A1-1 | 70 | B2 | 30 | 2 | E1 | 0.12 | G2 | 0.1 | 10 | 800 | 188 | >170 |
| Example 6 | A1-1 | 80 | B3 | 20 | 5 | E2 | 0.08 | G1 | 0.1 | 16 | 860 | 223 | >195 |
| Example 7 | A1-3 | 75 | B1 | 25 | 11 | E3 | 0.12 | G1 | 0.1 | 3.5 | 600 | 188 | >170 |
| Example 8 | A1-1 | 45 | B1 | 55 | 25 | C1 | 0.42 | G2 | 0.4 | 0.5 | — | 130 | 100 |
| Comparative Example 1 | A1-3 | 65 | B1 | 35 | 11 | C1 | 8.0 | G1 | 8.0 | 1.1 | 500 | 110 | >100 |
| Comparative Example 2 | A1-3 | 75 | B2 | 25 | 11 | J1 | 0.2 | — | — | 45 | — | 170 | >150 |
| Comparative Example 3 | A1-1 | 72 | B1 | 28 | 11 | — | — | — | — | 14 | 790 | 170 | >152 |

| Example | Ultimate Elongation Length (%) | Bending Strength (kgf/cm$^2$) | Flexural Modulus (kgf/cm$^2$) | Vicat Softening Point (°C.) | Izod Impact Test −40° C. (kgf·cm/cm) | Face Impact Test (ductile fracture critical temperature) (°C.) | Weld Mark Evaluation | Flow Mark Evaluation | Boiling Xylene Insolubles Content (%) |
|---|---|---|---|---|---|---|---|---|---|
| Example 1 | 230 | 235 | 14,000 | 122 | 7.5 | −21 | C | B | 38 |
| Example 2 | >500 | 131 | 12,700 | 112 | 8.9 | −30 | A | B | 34 |
| Example 3 | >500 | 146 | 13,000 | 135 | 7.0 | −21 | B | B | 20 |
| Example 4 | >500 | 130 | 12,800 | 106 | 8.0 | −25 | B | A | 26 |
| Example 5 | >500 | 120 | 10,500 | 119 | 9.1 | −30 | B | B | 30 |
| Example 6 | >500 | 150 | 13,000 | 136 | 7.0 | −15 | A | C | 17 |
| Example 7 | >500 | 132 | 13,000 | 110 | 6.9 | −23 | B | B | 31 |
| Example 8 | 270 | 80 | 7,600 | — | 11.2 | −15 | D | D | 50 |
| Comparative Example 1 | >500 | 97 | 9,300 | 96 | 10.0 | −30 | B | D | 41 |
| Comparative Example 2 | >500 | 117 | 10,000 | 103 | 2.5 | −10 | E | E | 25 |
| Comparative Example 3 | >500 | 120 | 11,000 | 100 | 4.0 | −10 | E | C | 10 |

TABLE 2

Examples 9-21, Comparative Examples 4-7

| Example | (A1) Kind | (A1) Amount (wt %) | (B) Kind | (B) Amount (wt %) | (A2) Kind | (A2) Amount (wt %) | Softening Agent Amount (wt part) | Crosslinking Agent Kind | Crosslinking Agent Amount (wt part) | Polyfunctional monomer (G 1) Amount (wt part) | Melt Flow Rate (g/10 min) (at 230° C.) | Spiral Flow (mm) | Yield Tensile Strength (kgf/cm$^2$) |
|---|---|---|---|---|---|---|---|---|---|---|---|---|---|
| Example 9 | 1 | 65 | B1 | 35 | | | 20 | F1 | 0.50 | 0.60 | 0.6 | 640 | 140 |
| Example 10 | 1 | 60 | B2 | 40 | | | 10 | C1 | 0.50 | 0.60 | 0.4 | 520 | 140 |
| Example 11 | 2 | 55 | B2 | 45 | | | 5 | C2 | 0.50 | 0.60 | 2.5 | 580 | 145 |
| Example 12 | 2 | 65 | B3 | 35 | | | 20 | D1 | 0.50 | 0.60 | 3.2 | 860 | 130 |
| Example 13 | 3 | 65 | B1 | 35 | | | 20 | D2 | 0.20 | 0.20 | 0.7 | 650 | 110 |
| Example 14 | 4 | 65 | B4 | 35 | | | 20 | E1 | 1.50 | 1.80 | 2.0 | 700 | 110 |
| Example 15 | 1 | 65 | B3 | 35 | | | 20 | E2 | 0.50 | 0.60 | 1.2 | 680 | 140 |
| Example 16 | 1 | 65 | B3 | 35 | | | 10 | E3 | 0.50 | 0.60 | 0.4 | 560 | 160 |
| Example 17 | 1 | 65 | B1 | 25 | 1 | 10 | 20 | C1 | 0.08 | 0.10 | 0.7 | 660 | 140 |
| Example 18 | 1 | 65 | B1 | 25 | 2 | 10 | 20 | C1 | 0.30 | 0.30 | 0.8 | 670 | 140 |
| Example 19 | 1 | 85 | B1 | 15 | | | 20 | C1 | 0.50 | 0.60 | 10 | 700 | 170 |
| Example 20 | 1 | 65 | B2 | 35 | | | 35 | C1 | 0.50 | 0.60 | 2.0 | 680 | 88 |
| Comparative Example 4 | 1 | 65 | B1 | 35 | | | 20 | | 0 | 0 | 12 | 820 | 145 |
| Comparative Example 5 | 1 | 65 | B1 | 35 | | | 20 | C1 | 8.00 | 8.00 | 0.5 | 600 | 140 |
| Comparative Example 6 | 1 | 65 | B3 | 35 | | | 20 | J1 | 0.30 | — | 0.1 | 420 | 140 |
| Comparative Example 7 | 1 | 65 | B1 | 35 | | | 0 | C1 | 0.50 | 0.60 | 0.1 | 450 | 175 |

| Example | Ultimate Elongation Length (%) | Bending Strength (kgf/cm$^2$) | Flexural Modulus (kgf/cm) | Vicat Softening Point (°C.) | Izod Impact Test −40° C. (kgf·cm/cm) | Face Impact Test (ductile fracture critical temperature) (°C.) | Weld Mark Evaluation | Flow Mark Evaluation | Boiling Xylene Insolubles Content (%) |
|---|---|---|---|---|---|---|---|---|---|
| Example 9 | 580 | 90 | 3,050 | 93 | 25 | −25 | A | A | 25 |
| Example 10 | 590 | 90 | 2,900 | 94 | NB | −30 | B | B | 32 |
| Example 11 | 580 | 90 | 3,100 | 94 | NB' | −30 | B | B | 40 |
| Example 12 | 480 | 90 | 3,070 | 94 | 19 | −25 | A | A | 12 |
| Example 13 | 420 | 110 | 3,700 | 103 | 13 | −20 | A | B | 20 |
| Example 14 | 380 | 110 | 3,800 | 105 | 11 | −20 | A | A | 18 |
| Example 15 | 570 | 90 | 3,100 | 90 | 15 | −20 | B | A | 11 |
| Example 16 | 580 | 120 | 4,200 | 110 | 11 | −20 | B | B | 30 |
| Example 17 | 580 | 95 | 3,200 | 96 | 18 | −25 | B | B | 10 |
| Example 18 | 580 | 100 | 3,400 | 99 | 15 | −20 | B | A | 10 |
| Example 19 | 300 | 180 | 6,300 | 122 | 5 | −10 | C | C | 10 |
| Example 20 | 320 | 54 | 1,200 | 62 | 13 | −15 | B | B | 23 |
| Comparative Example 4 | 590 | 105 | 3,700 | 87 | 8 | −20 | E | B | 1 |
| Comparative Example 5 | 580 | 90 | 3,000 | 93 | 23 | −25 | B | B | 30 |
| Comparative Example 6 | 580 | 85 | 2,800 | 90 | 12 | −20 | C | E | 34 |
| Comparative Example 7 | 590 | 175 | 6,150 | 125 | 10 | −20 | B | C | 34 |

In Comparative Examples 1 and 5, white powder was formed on the surface.

What is claimed is:

1. A composition for injection molding comprising a partially crosslinked product, said partially crosslinked product being prepared by dynamically heat-treating a composition consisting essentially of:
   (A) 40-100% by weight of an α-olefin (co)polymer resin having 2 to 8 carbon atoms;
   (B) 0-60% by weight of rubbery substance;
   0.01-7 parts by weight, based on 100 parts by weight of said components (A)+(B), of a crosslinking agent selected from the group consisting of:
   (C) a dihydroaromatic compound or a polymer thereof,
   (D) an ether compound,
   (E) a tetrahydroaromatic compound, and
   (F) a cyclopentane compound; in combination with
   (G) 0.01-7 parts by weight of a polyfunctional unsaturated monomer based on 100 parts by weight of said components (A)+(B).

2. A composition for injection molding comprising 100 parts by weight of the composition of claim 1 and:
   (H) 1-50 parts by weight of a softening agent; and/or
   (I) 1-100 parts by weight of an inorganic filler.

3. A thermoplastic resin composition for vehicular exterior material comprising a partially crosslinked product, said partially crosslinked product being prepared by dynamically heat-treating a composition consisting essentially of:
(A) 40-90% by weight of an α-olefin (co)polymer resin having 2 to 8 carbon atoms;
(B)
10-60% by weight of a rubbery substance;
0.01-7 parts by weight, based on 100 parts by weight of said components (A)+(B), of a crosslinking agent selected from the group consisting of:
(C) a dihydroaromatic compound or a polymer thereof,
(D) an ether compound,
(E) a tetrahydroaromatic compound, and
(F) a cyclopentane compound; in combination with
(G) 0.01-7 parts by weight of a polyfunctional unsaturated monomer based on 100 parts by weight of said components (A)+(B).

4. A composition for exterior material comprising 100 parts by weight of the composition of claim 3 and:
(H) 1-50 parts by weight of a softening agent; and/or
(I) 1-100 parts by weight of an inorganic filler.

5. A composition as set forth in any of claims 1 to 2, wherein said α-olefin (co)polymer (A) having 2 to 8 carbon atoms is at least one member selected from the group consisting of polyethylene resins, polypropylene resins and poly-1-butene resins.

6. A composition as set forth in any of claims 1 to 2, wherein said rubbery substance (B) is an ethylene-propylene random copolymer rubber or an ethylene-propylene-diene random copolymer rubber.

7. A composition as set forth in any of claims 1 to 2, wherein said dihydroaromatic compound (C) is a 1,2-dihydroquinoline compound or a polymer thereof, or 9,10-dihydrophenanthrene; the ether compound (D) is dihydropyran or isopropenyl acetate; the tetrahydroaromatic compound (E) is 1,2,3,4-tetrahydronaphthalene, tetrahydrobenzene, or tetrahydrofuran, and the cyclopentane compound (F) is indene.

8. A composition as set forth in any of claims 1 to 2, wherein said polyfunctional unsaturated monomer (G) is a bismaleimide compound or a di(meth)acrylate compound.

9. A composition as set forth in claim 2 wherein said softening agent (H) is at least one member selected from the group consisting of paraffinic, naphthenic and aromatic petroleum distillates and synthetic oils.

10. A composition as set forth in any of claims 1 to 2, wherein said α-olefin (co)polymer (A) having 2 to 8 carbon atoms comprises:
(A-1) 40-90% by weight of a polypropylene resin, and
(A-2) 0-30% by weight of a polyethylene resin, provided the total amount of A1+A2 is in the range of 40% to 90% by weight.

11. A composition for injection molding comprising a partially crosslinked product, said partially crosslinked product being prepared by dynamically heat-treating a composition consisting essentially of:
(A) 40-100% by weight of at least one α-olefin (co)polymer resin selected from the group consisting of polyethylene resins, polypropylene resins and poly-1-butene resins;
(B)
10-60% by weight of a rubbery substance selected from the group consisting of an ethylene-propylene random copolymer rubber and an ethylene-propylene-diene random copolymer rubber;
0.01-7 parts by weight, based on 100 parts by weight of said components (A)+(B), of a crosslinking agent selected from the group consisting of:
(C) a dihydroaromatic compound or a polymer thereof selected from the group consisting of 1,2-dihydroquinoline compound or a polymer thereof and 9,10-dihydrophenanthrene,
(D) an ether compound selected from the group consisting of dihydropyran and isopropenyl acetate,
(E) a tetrahydroaromatic compound selected from the group consisting of 1,2,3,4-tetrahydronaphthalene, tetrahydrobenzene and tetrahydrofuran and
(F) indene; in combination with
(G) 0.01-7 parts by weight of a polyfunctional unsaturated monomer based on 100 parts by weight of said components (A)+(B), said polyfunctional unsaturated monomer selected from the group consisting of a bismaleimide compound and a di(meth)acrylate compound.

12. A composition for injection molding comprising 100 parts by weight of the composition of claim 11 and:
(H) 1-50 parts by weight of a softening agent; and/or
(I) 1-100 parts by weight of an inorganic filler.

* * * * *